US005392146A

United States Patent [19]
Jackson et al.

[11] Patent Number: 5,392,146
[45] Date of Patent: * Feb. 21, 1995

[54] OPTICAL ROTARY CONTROL DEVICE

[75] Inventors: Gregory D. Jackson, Sunrise; David E. Reiff; Mac W. Branan, both of Ft. Lauderdale; John C. Dzung, Plantation, all of Fla.

[73] Assignee: Motorola, Inc., Schaumburg, Ill.

[*] Notice: The portion of the term of this patent subsequent to Jan. 5, 2000 has been disclaimed.

[21] Appl. No.: 8,430

[22] Filed: Jan. 25, 1993

[51] Int. Cl.⁶ .............................. H04B 10/00
[52] U.S. Cl. .................... 359/145; 359/143; 359/146; 385/25; 250/229
[58] Field of Search ............. 359/142, 143, 144, 145, 359/146, 147, 148; 455/170.1; 250/229; 385/25, 26

[56] References Cited

U.S. PATENT DOCUMENTS

| | | | |
|---|---|---|---|
| 4,631,399 | 12/1986 | Ward | 250/229 |
| 4,645,294 | 2/1987 | Oguey et al. | 355/25 |
| 4,964,693 | 10/1990 | Branan, Jr. et al. | 359/146 |
| 5,173,795 | 12/1992 | Branan, Jr. et al. | 359/142 |
| 5,177,355 | 1/1993 | Branan, Jr. | 250/229 |
| 5,218,466 | 6/1993 | Brooks | 359/145 |
| 5,272,350 | 12/1993 | Solari et al. | 359/143 |

Primary Examiner—Richard E. Chilcot, Jr.
Assistant Examiner—Rafael Bacares
Attorney, Agent, or Firm—Lesley Ann Rhyne; M. Ghomeshi

[57] ABSTRACT

A rotary control device is provided comprising a light source (22), at least one light receptor (24) radially spaced from the light source (22), a light director (14) having means for directing light from the light source (22) to the receptor (24) and means for rotating the director (14) so that the light director (14) is in a first position when not directing light from the light source (22) to the light receptor (24) and the light director (14) is in a second position when directing light from the light source (22) to the light receptor (24). In another aspect of the invention, the optical rotary device further comprises an isolator (26) made of opaque material which surrounds four sides of the light receptor (24) and four sides of the light source (22). In a further aspect of the invention the light director includes a reflector (46) for directing the light from the light source (22) to the light receptors (24).

18 Claims, 2 Drawing Sheets

OPTICAL ROTARY CONTROL DEVICE

TECHNICAL FIELD

This invention relates generally to optical rotary control devices and more specifically to optical rotary control devices for radio frequency communication devices.

BACKGROUND

Switches and other controls for electronic devices are typically discrete component assemblies requiring multiple parts. A higher number of parts generally requires an increase in the size of the device and the space required to house the device as well as the cost. Furthermore, with an increase in number of parts there is a decrease in reliability. Discrete controls with multiple parts are difficult to interconnect to an electronic device. The discrete controls require separate interconnections which must be made from the control component to the rest of the electronic device, usually contained on a PCB (printed circuit board). The interconnections require flex circuits, hand soldered joints and wire connections, all which increase the cost and size of the electronic device. These interconnections consume valuable space that is often premium in small electronic devices such as portable radios. Moreover, making these interconnections complicates the assembly process, and creates the possibility of quality problems caused by PCB contamination and contact failure. Discrete controls also utilize mechanical contacts to achieve the control function. Such contacts degrade with time and use resulting in an unreliable control device.

Optical control devices which are well known in the art, have typically required a multiple number of light sources and/or a multiple number of light receptors. At least one light receptor is required for each control state. Thus, such conventional optical devices require premium board space and are expensive. Furthermore, conventional optical devices have not provided absolute position indication upon start up. In other words, such conventional optical devices only give relative information from an unknown state. Alternatively, optical control devices that measure the intensity of reflected light to an optical receiver are also well known and are of the type disclosed in U.S. Pat. No. 4,964,693 to Branan et al. Such a device requires appropriate control circuitry capable of measuring the intensity of the reflected light.

Since consumers demand smaller and more reliable control devices, a need exists for a reliable optical switch, as an absolute position indicator, that can be easily manufactured and consume only a small portion of the apparatus in which it is contained.

SUMMARY OF THE INVENTION

Briefly, according to the invention, there is provided an optical rotary control device, comprising a light source, at least one light receptor radially spaced from the light source, a light director having means for directing light from the light source to the receptor and means for rotating the director so that the light director is in a first position when not directing light from the light source to the light receptor and the light director is in a second position when directing light from the light source to the light receptor. In another aspect of the invention, the optical rotary device further comprises an isolator made of opaque material which surrounds four sides of the light receptor and four sides of the light source. In a further aspect of the invention the light director comprises a circular portion with a first diameter and a shaft portion integrally connected to the circular portion, the shaft portion having a second diameter usually smaller than the first diameter of the circular portion. The circular portion includes a reflector for directing the light from the light source to the light receptors.

DETAILED DESCRIPTION OF THE PREFERRED EMBODIMENT

Figure 1:
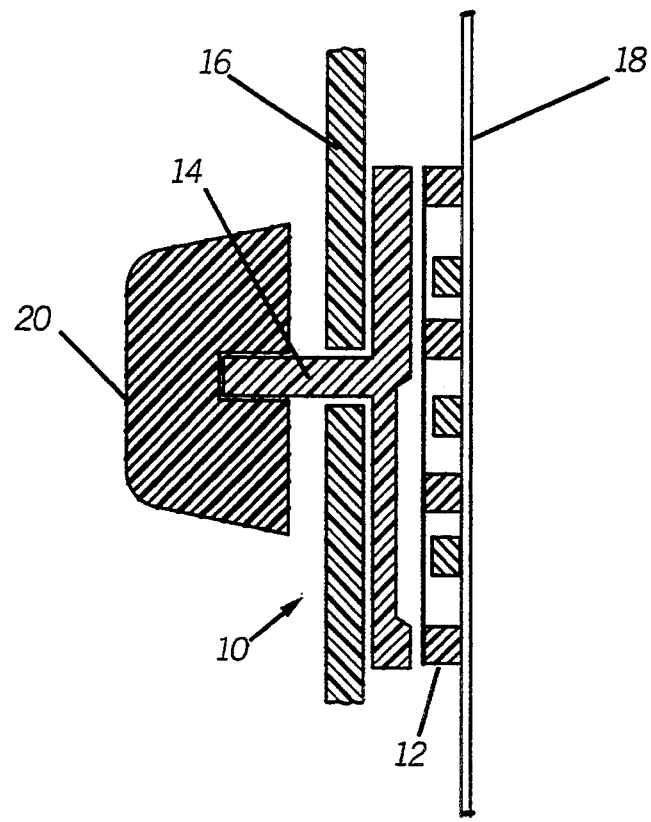
FIG. 1 is a cross-sectional side view of an optical rotary control device according to the invention.

While the specification concludes with claims defining the features of the invention that are regarded as novel, it is believed that the invention will be better understood from a consideration of the following description in conjunction with the drawing figures, in which like reference numerals are carried forward.

FIG. 1 shows a cross-sectional side view of an optical rotary control device 10 according to the invention. The control device 10 includes a radial array 12 mounted on a circuit assembly such as a flexible circuit or PCB (printed circuit board) 18 within a radio housing 16. A knob 20 for controlling a parameter of the radio, such as volume or channel select, is located on the outside of the radio housing 16. Mounted within the knob 20 is a light director 14. The light director 14 extends through the radio housing 16 and is spaced from the radial array 12 or is rotatably connected to the radial array 12 on the circuit assembly 18. Alternatively, the light director 14 may be rotatably attached to the radio housing 16 and spaced so that it rotates over the radial array 12.

Figure 2:
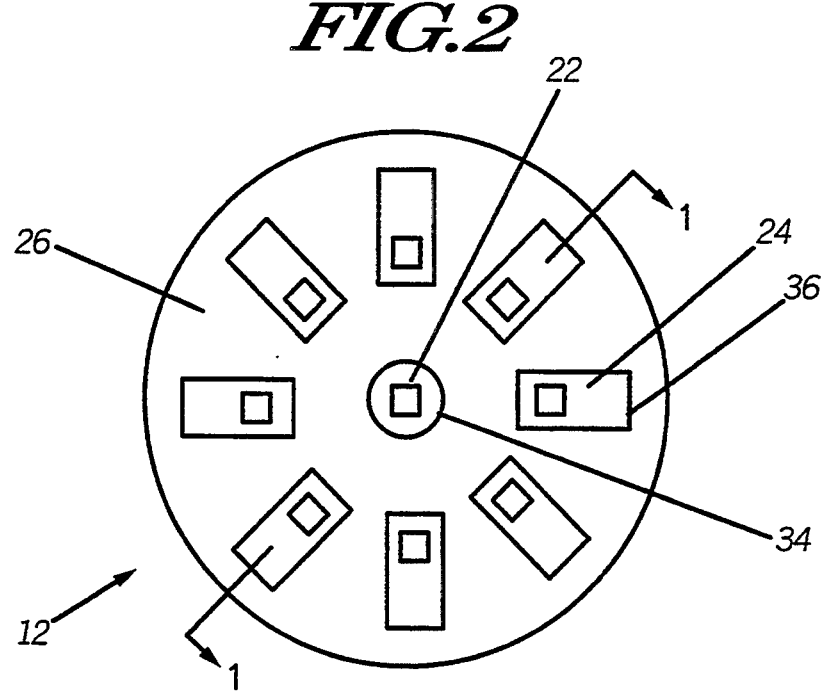
FIG. 2 is a top view of a radial array according to the invention.

FIG. 2 shows a preferred embodiment of a radial array 12 according to the invention. The shown radial array 12 is circular in shape but may be semicircular or any geometric shape that defines a radial pattern of an isolator portion 26 with a center aperture 34 surrounded by eight radially disposed apertures 36 about the center aperture 34. Depending upon the application, the number of radially disposed apertures 36 about the center aperture 34 may vary. The center aperture 34 of the isolator portion 26 is for receiving and isolating a light source, such as a LED (light emitting diode) 22. The eight radially arranged apertures 36 about the center aperture 34 are for receiving and isolating light receptors, such as photo transistors or photo diodes 24.

The isolator portion 26 may be :made of any opaque material. The phototransistors 24 are set within the isolator portion 26 of the radial array 12. Each phototransistor 24 is surrounded on four sides by the opaque material of the isolator 26. The LED 22 is surrounded by the opaque material of the isolator 26 as well. The isolator portion 26 is designed so that a light director 14 spaced from the radial array directs light, visible or infrared, from the LED 22 to one or two of the phototransistors 24 at one time. The isolator portion 26 also keeps ambient light from exciting the phototransistors 24 unintentionally. The isolator portion 26 may be separately adhesively bonded to a circuit assembly, such as a flexible circuit or PCB 18. Signals from the phototransistors 24 may be directly outputted to a microprocessor or controller of the radio by circuit lines running underneath the radial array 12 and to the microprocessor or microcontroller. A common transparent epoxy such as a glob top or other suitable material covers the LED 22, phototransistors 24 and wire bonds as a protective coating.

Figure 3:
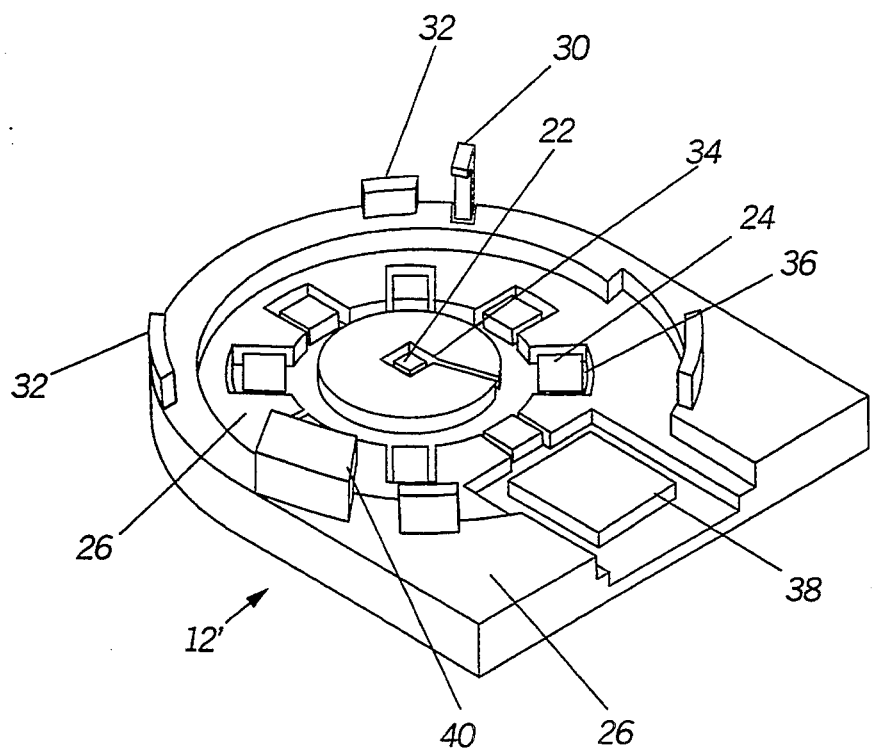
FIG. 3 is a perspective view of a second embodiment of a radial array according to the invention.

In a second embodiment of the invention, the radial array 12' may be a separate molded-in circuit carrier piece that can be selectively metalized, i.e. 3-D molded circuit, as shown in FIG. 3, and the entire circuit carrier piece can be reflow soldered or surface mounted onto a circuit assembly. Cantilever snaps 30 may be used to rotatably connect the light director 14 to the radial array 12'. A hook 40 may be used to assist the snap fit alignment of the light director 14. Guides 32 may be used for precisely rotating the light director 14 when snapped onto the radial array 12'.

A logic die 38 may be integral to the isolator portion 26 of the radial array 12' or separately mounted on the circuit assembly 18. The logic die 38 receives input from the phototransistors 24 and depending on the input, outputs a particular control state to the microprocessor of the radio. The logic die 38 decodes which phototransistors 24 are excited and outputs a desired control state accordingly. A simple decoding scheme based on a truth table can be implemented in the logic die 38. Integral integrated circuits for encoding a plurality of switch inputs into a combination of switch outputs are known and one in particular has been disclosed in U.S. Pat. No. 5,153,319 for a mechanical switch assembly. By using an integral digital decoding scheme, the preferred embodiment of the present invention is more resistant to interference and noise than conventional analog control devices.

Figure 4:
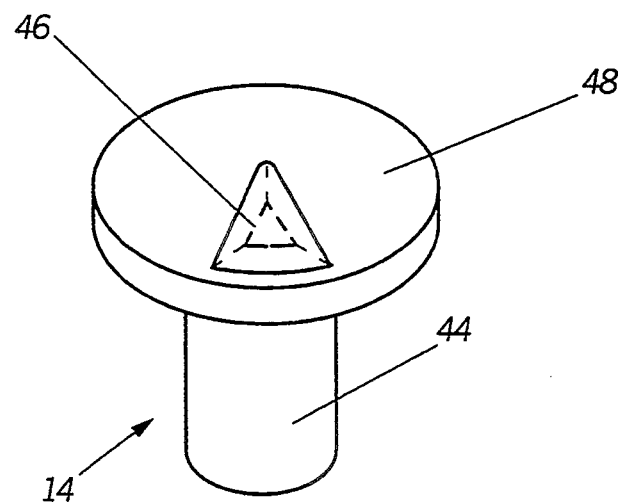
FIG. 4 is a perspective view of a light director according to the invention.

FIG. 4 shows a perspective view of a light director 14 in accordance with the invention. The light director 14 includes a circular portion 48 having a reflector 46 or concave surface for reflecting light from the LED 22 to the phototransistors 24. The reflector 46 is substantially triangular in shape and extends into the circular portion 48. The reflector 46 is geometrically defined for reflecting light from the LED 22 to one of the phototransistors 24 or two of the phototransistors 24. In another aspect of the invention, a light pipe arrangement may be used instead of the reflector 46 to direct light to the phototransistors 24.

The light director 14 includes a shaft portion 44 for rotating the circular portion 48 of the light director 14. The shaft portion 44 is integral with the circular portion 48 and has a diameter that is usually smaller than that of the circular portion 48. The shaft portion 44 may extend into a knob 20 of a radio housing 16 (as shown in FIG. 1) or the shaft portion 44 may extend from the radio housing 16 and function as a knob used by an operator to control the rotary optical control device 10. By simply rotating the shaft portion 44 an operator selects a desired output of the radio.

In operation, the LED 22 is strobed by the microprocessor to reduce current drain. The light director 14 is spaced from the phototransistors 24 and the phototransistors 24 are spaced apart so that when the light director 14 directs light from the LED 22 to the phototransistors 24, the light can be directed to one or two of the phototransistors 24. Thus, there are sixteen possible output states for an optical control device 10 that has eight phototransistors 24 arranged as shown. In the preferred embodiment, two phototransistors 24 are used for outputting even numbered positions. Alternatively, the light director 14 and radial array 12 may be designed and spaced so that it only reflects light to only one of the phototransistors 24 or none of the phototransistors 24 and thus, the optical control device 10 may simply serve as an on and off switch. The light director 14 and radial array 12 could even be designed to reflect light to a combination of a multiple phototransistors 24. The light reflection is a function of the surface of the light director 14 spaced from the arrangement of the phototransistors 24 on the radial array 12 so that when rotated the light director 14 directs light from the LED 22 to the phototransistors 24. Thus, there can be any number of absolute output states depending upon the number of phototransistors 24 and the light director 14. The present invention outputs from the phototransistors 24 an absolute position control state dependent upon which phototransistors 24 in combination or alone are excited. Even upon start up, an absolute state or position can be determined by the output of the phototransistors 24.

In summary, an integral radial array 12 provides the light source 22, light receptors 24, and the isolator 26. A light director 14 directs the light source 22 accordingly. The present invention uses only a single moving part to achieve an optical rotary control device. Thus, a miniaturized optical rotary switch is provided that is reliable and small enough for applications in any device requiring a rotary control function in particular, portable and mobile radios.

While the invention has been particularly shown and described with reference to several preferred embodiments thereof, it will be understood by those skilled in the art that various changes in form and detail may be made without departing from the spirit or scope of the invention.

What is claimed is:

1. An optical rotary control device, comprising:
   a light source;
   at least one light receptor radially spaced from said light source;
   a light director having means for directing light from the light source to the receptor;
   means for rotating said light director so that said light director is in a first position when not directing light from said light source to said light receptor and said light director is in a second position when directing light from said light source to said light receptor.

2. The optical rotary control device of claim 1 wherein said light director further comprises a circular portion with a first diameter and a shaft portion integrally connected to said circular portion, said shaft portion having a second diameter smaller than said first diameter of said circular portion.

3. The optical rotary control device of claim 1 further comprising an isolator comprising opaque material surrounding four sides of said light receptor and four sides of said light source.

4. The optical rotary control device of claim 1 wherein said light director and said means for rotating said light director is a single movable part.

5. The optical rotary control device of claim 1 wherein said means for directing light includes a reflector having a concave surface.

6. The optical rotary control device of claim 1 wherein said means for directing light includes a light pipe.

7. An optical rotary control device, comprising:
an opaque radial light isolator having a center aperture with at least two radially arranged apertures about said center aperture;
a light source disposed within said center aperture of said isolator;
at least two light receptors disposed within said radially arranged apertures of said isolator;
a rotatable light director having means for directing light from the light source to at least one of said receptors.

8. The optical rotary control device of claim 7 wherein said light director directs light to at least two of said light receptors simultaneously.

9. The optical rotary control device of claim 7 wherein said light director includes a shaft portion and a reflector portion wherein a diameter of said reflector portion is larger than a diameter of said shaft portion, said reflector portion having a reflector and being spaced from said isolator so that said reflector directs light from said light source to said receptors.

10. The optical rotary control device of claim 7 wherein said isolator is circular in shape.

11. The optical rotary control device of claim 7 wherein said reflector portion reflects light from said light source to at least two of said reflectors.

12. An optical switch assembly, comprising:
a circuit board;
a light emitting diode mounted on said circuit board;
a plurality of light receptors mounted on said circuit board, and radially disposed about said light emitting diode;
a rotatable light director for selectively directing light from said light emitting diode to said light receptors.

13. The optical switch assembly of claim 12 further comprising an isolator comprising opaque material surrounding four sides of said light receptor and four sides of said light source.

14. The optical switch assembly of claim 12 wherein said light director includes a reflector having a concave surface.

15. A radio and an optical rotary control device, comprising:
a radio portion having a rotatable knob for controlling a parameter of said radio;
said optical rotary device comprising;
an opaque radial light isolator having a center aperture with eight radially arranged apertures about said center aperture;
a light source disposed within said center aperture of said isolator;
eight light receptors disposed within said radially arranged apertures of said isolator;
a light director within said knob of said radio and having a shaft portion and a reflector portion wherein a diameter of said reflector portion is larger than a diameter of said shaft portion, said reflector portion being spaced from said isolator so that said reflector directs light from said light source to said receptors.

16. The radio and optical rotary control device of claim 15 wherein said light director directs light to at least two of said receptors simultaneously.

17. The radio and optical rotary control device of claim 15 further comprising an integral logic die connected to said device for outputting a control state to a radio.

18. The radio and optical rotary control device of claim 15 wherein said isolator further comprises means for rotatably connecting said knob to said isolator.

* * * * *